(12) United States Patent
Choi et al.

(10) Patent No.: US 10,169,913 B2
(45) Date of Patent: Jan. 1, 2019

(54) APPARATUS FOR GENERATING 3D VOLUME MASK MODEL AND METHOD THEREFOR

(71) Applicant: ELECTRONICS AND TELECOMMUNICATIONS RESEARCH INSTITUTE, Daejeon (KR)

(72) Inventors: Yoon Seok Choi, Daejeon-si (KR); Seung Woo Nam, Daejeon-si (KR); In Su Jang, Daejeon-si (KR); Soon Chul Jung, Daejeon-si (KR); Jin Seo Kim, Daejeon-si (KR); Soon Young Kwon, Daejeon-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 156 days.

(21) Appl. No.: 15/292,635

(22) Filed: Oct. 13, 2016

(65) Prior Publication Data

US 2017/0256093 A1 Sep. 7, 2017

(30) Foreign Application Priority Data

Mar. 4, 2016 (KR) ........................ 10-2016-0026126

(51) Int. Cl.
*G06T 17/20* (2006.01)
*G06T 19/20* (2011.01)
(Continued)

(52) U.S. Cl.
CPC .......... *G06T 17/20* (2013.01); *G06K 9/00214* (2013.01); *G06K 9/00248* (2013.01);
(Continued)

(58) Field of Classification Search
None
See application file for complete search history.

(56) References Cited

U.S. PATENT DOCUMENTS

2012/0192884 A1 8/2012 Nasu et al.

FOREIGN PATENT DOCUMENTS

KR 10-2009-0065965 A 6/2009
KR 10-2010-0104093 A 9/2010
(Continued)

OTHER PUBLICATIONS

Chang-Suk Cho, Jun-Young Park, Adrian Boeing, Philip Hingston, "An implementation of a garment-fitting simulation system using laser scanned 3D body data", 2010, Elsevier, Computers in Industry, vol. 61, pp. 550-558.*

(Continued)

*Primary Examiner* — Robert Bader
(74) *Attorney, Agent, or Firm* — LRK Patent Law Firm

(57) ABSTRACT

An apparatus for generating 3-dimensional (3D) volume mask model and a method therefor. The apparatus includes a 2D mask data collector, a 3D mask model generator, and a 3D mask model adjuster, whereby 2D mask data is generated from a 2D mask image designed by a user, a 2D mask mesh is created based on inner and outer contour feature points, a 2D mask is transformed into a 3D model according to the user's settings, and the generated 3D mask model is modified to fit on a facial shape of a person who will wear the mask, and a 3D mask volume model is generated, which is immediately printed by a 3D printer to produce a 3D mask.

10 Claims, 12 Drawing Sheets

(51) Int. Cl.
_G06K 9/00_ (2006.01)
_A41G 7/00_ (2006.01)
(52) U.S. Cl.
CPC ............... _G06T 19/20_ (2013.01); _A41G 7/00_
(2013.01); _G06T 2219/2021_ (2013.01)

(56) References Cited

FOREIGN PATENT DOCUMENTS

KR 10-2015-0076765 A 7/2015
KR 0-1543684 B1 8/2015

OTHER PUBLICATIONS

In Hwan Sul, Tae Jin Kang, "Interactive garment pattern design using virtual scissoring method", 2006, Emerald Group Publishing Limited, International Journal of Clothing Science and Technology, pp. 31-42.*

Thomas W. Sederberg, Scott R. Parry, "Free-Form Deformation of Solid Geometric Models", Aug. 22, 1986, ACM, SIGGRAPH '86 Proceedings of the 13th annual conference on Computer graphics and interactive techniques pp. 151-160.*

AutoDesk, "Extrude (Command)", Dec. 16, 2015, website, retrieved from "https://knowledge.autodesk.com/support/autocad/learn-explore/caas/CloudHelp/cloudhelp/2016/Enu/AutoCAD-Core/files/GUID-85FD1106-8F10-4EE8-Bofb-99F1E3AEE405-htm.html" on May 14, 2018.*

* cited by examiner

APPARATUS FOR GENERATING 3D VOLUME MASK MODEL AND METHOD THEREFOR

CROSS-REFERENCE TO RELATED APPLICATION(S)

This application claims the benefit under 35 USC § 119(a) of Korean Patent Application No. 10-2016-0026126, filed on Mar. 4, 2016, in the Korean Intellectual Property Office, the entire disclosure of which is incorporated herein by reference for all purposes.

BACKGROUND

1. Field

The following description relates to an apparatus for generating 3-dimensional (3D) volume mask model and a method therefor, and more particularly, to an apparatus and method for generating 3D volume mask model for producing a customized facial mask model, for which a 3D mask model is generated based on a 2D mask image designed by a user for a mask having a part that is located beyond a surface area of a face and the 3D mask model is modified to fit on a generated 3D face model.

2. Description of Related Art

Facial masks began to be widely used in ancient times for camouflage or for protection purpose in the event of war, hunting, etc., or used to express various subjects of beliefs in religious events, such as rituals and prayers. In addition, with the development of civilization, masks were utilized as tools for expressing the artistic sensibility in concerts or festivals. For the Korean mask performance, "talnolyi," (a mask is called "tal" in Korean language), various masks have been used to portray roles of each character, and masks with various expressions for describing delicate looks have been developed and inherited.

Recently, the use of masks has been increasing in performances, such as plays, musical plays, etc. Some large-scale shows, such as Cirque du Soleil, have moved away from the conventional ways of revealing the plot through the characters' lines, but convey intended meanings through state-of-the-art media production and mime performances. In such shows, personality and identity of each character are expressed by the makeup, and the characters' emotions are delivered to the audience by emphasizing the role in the play. In addition, the colorful makeup does not only serve as a tool of communication in the show, but also increases the aesthetic value of the show.

In particular, in a large-scale show having many characters, some performers may need to play multiple characters, for which they replace makeup masks that are prepared for different roles. The making process of the makeup masks requires sophisticated work. From a performance planning, masks need to be designed by taking into consideration the performance background and characteristics of each character, and to be tailored to the performers who wear the masks.

However, the mask making process is not simple, and it is time and cost consuming to take into account the personal appearance of each performer, such as the height of the nose, the distance between the eyes, and the forehead area. For these reasons, the masks are generally made in standard sizes consisting of, for example, large, medium, and small, and the performers wear masks that fit properly to their faces.

The masks with a portion that is located beyond the surface area of a face, such as some traditional masks or character masks (e.g., a batman mask), cannot be easily created by simply modifying a 3D scanned face model, and hence an effective making method may be required.

Increasing use of 3D scanners and 3D printers provides a suitable environment for making a customized 3D makeup mask.

A 3D scanned face model may be acquired from a 3D scanner, and a mask that fits on the scanned face may be made based on said face model. A 3D mask with a final appearance is output by a 3D printer and then additional makeup is painted on the output 3D mask to complete a makeup mask. However, although the environment for mask making has been prepared, dealing with 3D modeling tools and model transformation for 3D printer printing may be difficult tasks to ordinary users who lack the relevant experiences especially when creating a mask model whose appearance does not fit on the 3D scanned face model or the user's face and which has a portion that is located beyond a surface area of the face, and hence, a need for tools for customized 3D mask which facilitate the making of makeup masks or character masks based on the underlying environment is increasing.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an apparatus and method for making a customized 3D mask, for which a 3D mask model is created based on a 2D mask image designed by a user in which a part of a mask is located beyond the surface area of a face, the 3D mask model is modified to fit on a 3D face model that is obtained using various methods, such as a scanner and Kinect, and the modified 3D mask model is output by a 3D printer.

In one general aspect, there is provided an apparatus for generating 3-dimensional (3D) volume mask, including: a 2-dimensional (2D) mask data collector configured to generate 2D mask feature data, which contains feature points, by using contour data extracted from a 2D mask image, generate at least one group of triangles by using the 2D mask feature data and grouping every three proximal feature points, and generate 2D mask mesh with the at least one group of triangles; a 3D mask model generator configured to calculate a vertex z-value in 3D space using X-Y coordinate values of a vertex of a 2D mask which are contained in the 2D mask mesh, and generate 3D mask model using the calculated vertex z-value; and a 3D mask model adjuster configured to modify the 3D mask model to be located in 3D space based on acquired 3D face scanning data, extract outer vertex data of the modified 3D mask model, and generate 3D volume mask model by connecting corresponding outer vertices and thereby creating volume for the 3D mask model.

The apparatus may further include a 3D volume mask model database configured to store the generated 3D volume mask model and provide the 3D volume mask model on request.

The 2D mask data collector may be configured to include a 2D mask feature data generator configured to extract the contour data about an outer contour and holes inside a mask from received 2D mask image, generate feature points on a mask shape using the extracted contour data, and generate the 2D mask feature data that contains the feature points; and a 2D mask mesh generator configured to generate the at least one group of triangles by using the 2D mask feature data and grouping every three proximal feature points, designate at least one additional background point that is required for reducing the number of obtuse-angled triangles that correspond to the at least one group of triangles, and generate the 2D mask mesh using the at least one group of triangles and the at least one background point.

The 2D mask feature data generator may be configured to set a background of the received 2D mask image to be transparent or fill the background with a specific color.

The 2D mask feature data generator may be configured to represent the outer contour and the holes differently in the contour data, thereby distinguishing between external and interior areas of the mask.

The 3D mask model data generator may be configured to transform a planar mask model into a curved 3D mask by applying a predetermined curvature to the generated 3D mask model data.

The 3D mask model adjuster may be configured to include: a 3D mask model modifier configured to match the 3D face scanning data acquired by scanning a user's face with the 3D mask model in 3D space, and modify the 3D mask model to fit on a facial shape specified by the 3D face scanning data and a 3D mask model volume adder configured to copy the modified 3D mask model to create two 3D mask models, extract outer vertices of the two 3D mask models to generate outer vertex data of each mask model, and create volume by connecting vertices of one 3D mask model to corresponding vertices of the other 3D mask model at a specific distance, thereby generating the 3D volume mask model.

In another general aspect, there is provided a method for generating 3-dimensional (3D) volume mask, including: generating 2D mask feature data, which contains feature points, by using contour data extracted from a 2D mask image, generating at least one group of triangles by using the 2D mask feature data and grouping every three proximal feature points, and generating 2D mask mesh with the at least one group of triangles; calculating a vertex z-value in 3D space using X-Y coordinate values of a vertex of a 2D mask which are contained in the 2D mask mesh, and generating 3D mask model using the calculated vertex z-value; and modifying a 3D mask model to be located in 3D space based on acquired 3D face scanning data, extracting outer vertex data of the modified 3D mask model, and generating 3D volume mask model by connecting corresponding outer vertices and thereby creating volume for the 3D mask model.

The method may include storing the generated 3D volume mask model and providing the 3D volume mask model on request.

The generation of the 2D mask mesh may include: extracting the contour data about an outer contour and holes inside a mask from received 2D mask image, generating the feature points on a mask shape using the extracted contour data and generating the 2D mask features that contains the feature points; and generating the at least one group of triangles by using the 2D mask feature data and grouping every three proximal feature points, designating at least one additional background point that is required for reducing the number of obtuse-angled triangles that correspond to the at least one group of triangles, and generating the 2D mask mesh using the at least one group of triangles and the at least one background point.

The generation of the 2D mask feature data may include setting a background of the received 2D mask image to be transparent or filling the background with a specific color.

The generation of the 2D mask feature data may include representing the outer contour and the holes differently in the contour data, thereby distinguishing between external and interior areas of the mask.

The generation of the 3D mask model may include transforming a planar mask model into a curved 3D mask by applying a predetermined curvature to the generated 3D mask model.

The generation of the 3D volume mask model may include: matching the 3D face scanning data acquired by scanning a user's face with the 3D mask model in 3D space, and modifying the 3D mask model to fit on a facial shape specified by the 3D face scanning data; and copying the modified 3D mask model to create two 3D mask models, extracting outer vertices of the two 3D mask models to generate outer vertex data of each mask model, and creating volume by connecting vertices of one 3D mask model to corresponding vertices of the other 3D mask model at a specific distance, thereby generating the 3D volume mask model data.

Other features and aspects will be apparent from the following detailed description, the drawings, and the claims.

Figure 1:
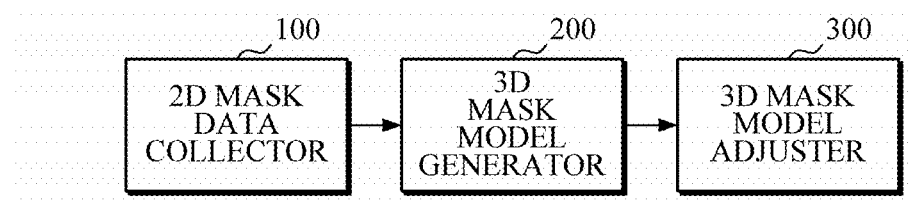
FIG. 1 is a diagram illustrating an apparatus for generating 3-dimensional (3D) volume mask model according to one exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Herein, an apparatus for generating 3-dimensional (3D) volume mask model and a method thereof according to exemplary embodiments of the present disclosure will be described with reference to the accompanying drawings.

FIG. 1 is a diagram illustrating an apparatus for generating 3D volume mask model according to one exemplary embodiment.

Referring to FIG. 1, the apparatus for generating 3D volume mask model according to the exemplary embodiment includes a 2-dimensional (2D) mask data collector 100, a 3D mask model generator 200, and a 3D mask model adjuster.

The 2D mask data collector 100 uses contour data which is extracted from a 2D mask image in order to generate 2D mask feature data that contains contour features, and it uses the 2D mask feature data to generate at least one group of triangles, each composed of three proximal feature points, and generates 2D mask mesh with at least one group of triangles.

Here, the 2D mask feature data may refer to data that contains at least one feature point of the outline of the 2D mask image that is obtained using inner and outer contours extracted from the 2D mask image.

According to the exemplary embodiment, the feature point may refer to one of multiple points forming the contours of a mask when the point is located at a characteristic part that can define the shape of the mask.

According to the exemplary embodiment, the 2D mask mesh may refer to a structure that consists of at least one group of triangles, for which every three proximal vertices are grouped together into a triangle based on 2D position (x, y) of each contour feature point in an image space, and the 3D mask model may be generated based on the 2D mask mesh.

The 2D mask data collector 100 will be described in detail with reference to FIG. 3.

The 3D mask model generator 200 may calculate a vertex z-value in 3D space using X-Y coordinate values of a vertex of the 2D mask that are contained in the 2D mask mesh, and may, in turn, generate the 3D mask model using the calculated vertex z-value.

According to the exemplary embodiment, the 3D mask model generator 200 may add a z-value to each vertex (x, y) that forms the 2D mask model, thereby transforming the vertices in 2D space into the vertices in 3D space.

According to the exemplary embodiment, a plane mask may be transformed into a curved surface by applying a predetermined curvature to the generated 3D mask model.

The 3D mask according to the generated 3D mask model may be planar when it is transformed from the 2D mask image.

However, a mask is generally arched to fit the facial contour, and hence a curvature predetermined by a user may be used to transform the planar mask into a curved 3D mask.

The 3D mask model adjuster 300 may locate the 3D mask model in 3D space based on obtained 3D face scanning data, and modify the 3D mask model. Then, the 3D mask model adjuster 300 may copy the modified profile 3D mask model, extract outer vertex data of each modified profile 3D mask model, and connect corresponding outer vertices between the two 3D mask models in order to create volume, thereby generating 3D volume mask model.

Here, the 3D face scanning data may refer to face shape data obtained by scanning the user's face, or pre-stored face shape data.

According to the exemplary embodiment, the outer vertex of the 3D mask model may refer to at least one of points including apexes of the 3D mask model and intermediate points along the outer contour.

According to the exemplary embodiment, the 3D volume mask model may refer to data about a 3D volume mask model obtained by applying a thick value on a volume with a predetermined specific thickness to the 3D mask model.

The 3D mask model adjuster 300 will be described in detail with reference to FIG. 4.

According to the exemplary embodiment, the apparatus for generating 3D volume mask model may generate 3D volume mask model of a mask having a part that is located beyond the face's surface area.

Figure 2:
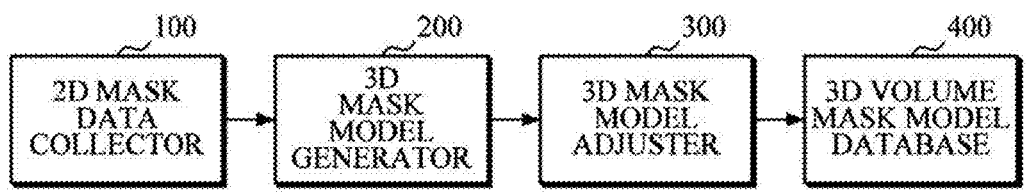
FIG. 2 is a diagram illustrating an apparatus for generating 3D volume mask model according to another exemplary embodiment.

FIG. 2 is a diagram illustrating an apparatus for generating 3D volume mask model according to another exemplary embodiment.

Referring to FIG. 2, the apparatus for generating 3D volume mask model in accordance with the second exemplary embodiment further includes a 3D volume mask model database 400 as compared with the exemplary embodiment of FIG. 1.

The 3D volume mask model database 400 stores generated 3D volume mask model and may provide 3D volume mask model upon request.

According to the exemplary embodiment, the 3D volume mask model database 400 may create a general-purpose model with the 3D volume mask model and provide the created model so as to be utilized by any applications.

Figure 3:
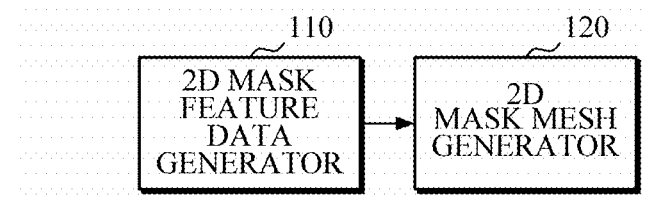
FIG. 3 is a diagram illustrating in detail a 2-dimensional (2D) mask data collector of FIG. 1.

FIG. 3 is a diagram illustrating in detail the 2D mask data collector of FIG. 1.

Referring to FIG. 3, the 2D mask data collector 100 includes a 2D mask feature data generator 110 and a 2D mask mesh generator 120.

The 2D mask feature data generator 110 may extract contour data about the outer contour and holes inside the mask from the 2D mask image data, acquire feature points on the mask shape from the extracted contour data, and generate 2D mask feature data that contains the feature points.

According to the exemplary embodiment, the 2D mask feature data generator 110 may extract data required for 3D mask model creation from the received 2D mask image data.

At this time, the 2D mask feature data generator 110 extracts data about not only the contours of the 2D mask, but also the holes in the mask from the 2D mask image, generates the feature points thereof and stores the generated data as mask data.

Here, the feature data of the 2D mask image may be generated by extracting contour feature points from the image, excluding the background.

According to the exemplary embodiment, in order to facilitate the extraction of contour feature points, the background may be set to be transparent or to be filled with a specific color during the mask design process.

According to the exemplary embodiment, the contour data may use different colors for the outer contour and the inner holes, thereby distinguishing between the external and internal areas of the mask.

The 2D mask mesh generator 120 may use the 2D mask contour feature data to generate at least one group of triangles, each composed of three proximal feature points, designate at least one additional background point that is required for reducing the number of obtuse-angled triangles that correspond to at least one group of triangles, and generate 2D mask mesh using said at least one group of triangles and said background point.

Here, the 2D mask mesh refers to a net structure that consists of at least one group of triangles, each composed of three proximal feature points, and this will be described in detail with reference to FIGS. 7 and 8.

According to the exemplary embodiment, in the course of generating the 2D mask mesh, at least one additional background point may be used to reduce the number of the existing contour feature points and obtuse-angled triangles that correspond to at least one group of triangles, each composed of feature points.

Figure 4:
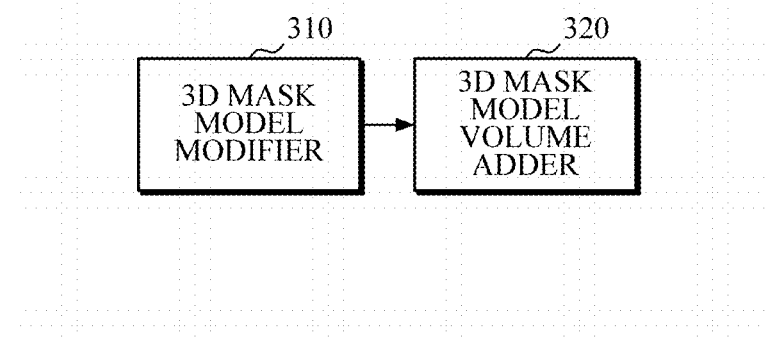
FIG. 4 is a diagram illustrating in detail a 3D mask model adjuster of FIG. 1.

FIG. 4 is a diagram illustrating in detail the 3D mask model adjuster of FIG. 1.

Referring to FIG. 4, the 3D mask model adjuster 300 includes a 3D mask model modifier 310 and a 3D mask model volume adder 320.

The 3D mask model modifier 310 may match 3D face scanning data obtained by scanning the user's face with the 3D mask model data in 3D space and modifies the 3D mask model to fit on the facial shape specified by the 3D face scanning data.

Here, the 3D face scanning data may refer to data about a facial shape acquired by scanning a person's face with a 3D scanner.

According to the exemplary embodiment, the acquired 3D face scanning data may be matched with the 3D mask model in 3D space, and then the 3D mask model may be modified to fit on the facial shape specified by the 3D face scanning data by adjusting the size, curves, and angles of the 3D mask model.

The 3D mask model volume adder 320 may copy the modified 3D mask model to create two 3D mask models, extract outer vertices of the two 3D mask models to generate outer vertex data of each mask model, and create volume by connecting vertices of one mask model to corresponding vertices of the other mask model at a specific distance, thereby generating the 3D volume mask model data.

Here, the outer vertex may refer to a point that can exhibit the appearance of the contour of the 3D mask model among a number of points on the outer contour.

According to the exemplary embodiment, by connecting outer vertices specified by the outer vertex data of one 3D mask model to corresponding outer vertices of the other mask model at a specific distance, a thickness can be created and thus the 3D mask model that originally does not have a thickness can have volume.

Figure 5:
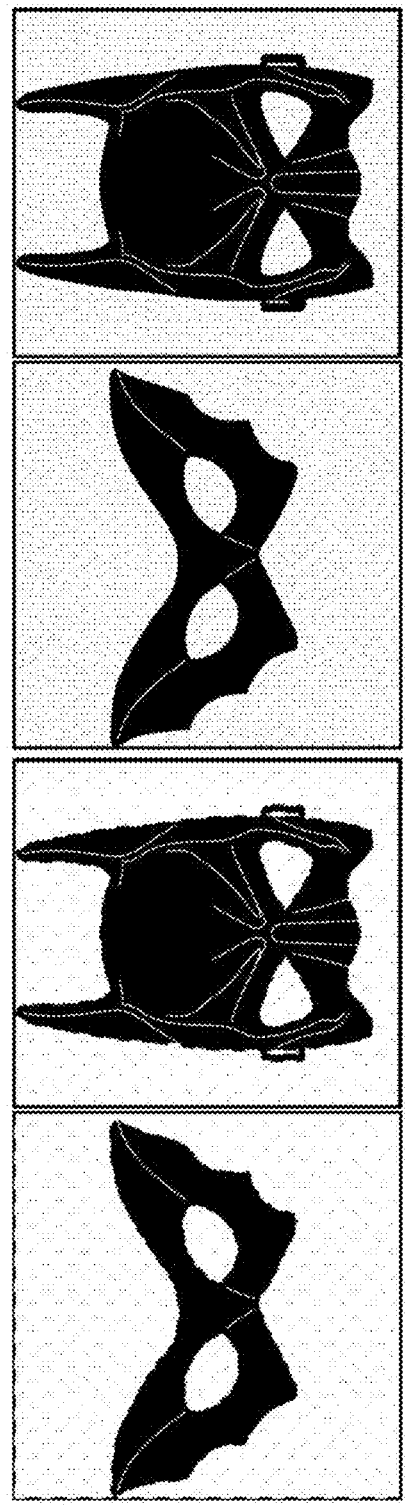
FIG. 5 is a diagram illustrating 2D mask images with a transparent background and with a specific colored background according to an exemplary embodiment.

FIG. 5 is a diagram illustrating 2D mask images with a transparent background and with a specific colored background according to an exemplary embodiment.

According to the exemplary embodiment, the 2D mask data collector 100 may use a 2D mask image from which a background is removed to facilitate the extraction of contour data from the 2D mask image to generate 2D mask feature data.

According to the exemplary embodiment, in order to remove the background from the 2D mask image, the background may be set to be transparent or to be filled with a specific color.

Figure 6:
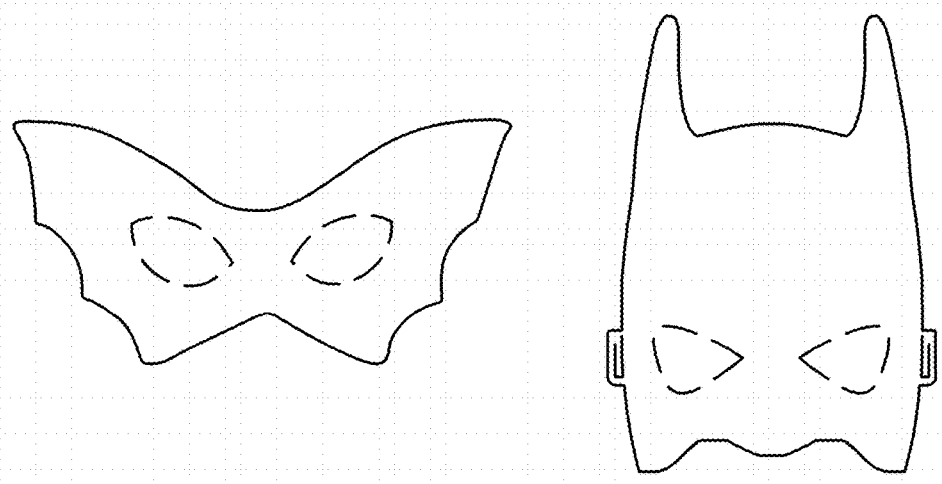
FIG. 6 is a diagram illustrating 2D mask images in each of which an outer contour is depicted by the solid lines and inner holes are depicted by the dashed lines.

FIG. 6 is a diagram illustrating 2D mask images, in each of which an outer contour is depicted by the solid lines and inner holes are depicted by the dashed lines.

According to the exemplary embodiment, the contour data extracted from the 2D mask image may consist of the outer contour and inner holes, and allow the mask's internal and external areas to be distinguished during the mask mesh process.

Referring to FIG. 6, among the contours extracted from the 2D mask image, the outer contour is depicted by the solid line and the inner holes are depicted by the dashed lines, whereby the external and internal areas of the mask can be distinguished in the 2D mask image.

Figure 7:
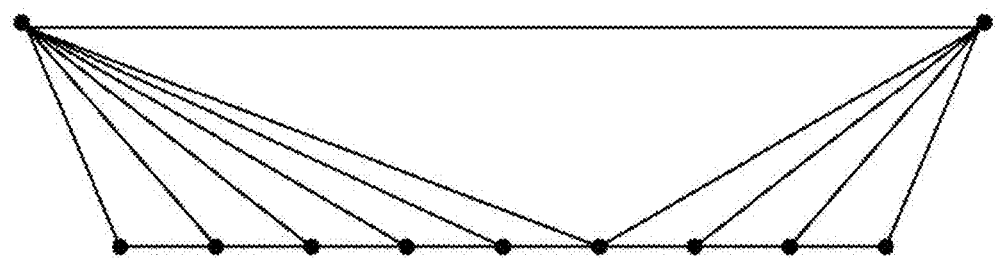
FIG. 7 is a diagram illustrating a 2D mask mesh that is generated by applying additional background points according to an exemplary embodiment.
Figure 7:
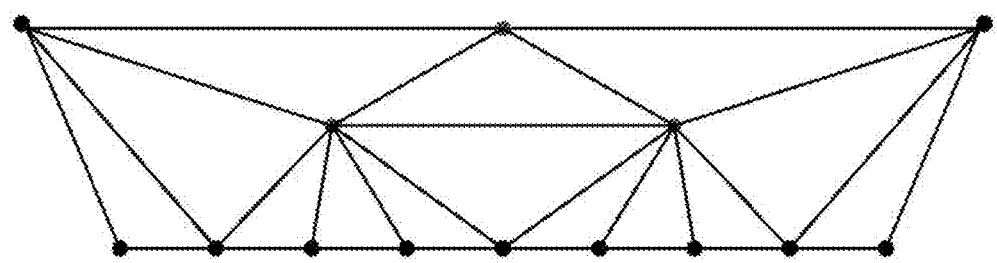

FIG. 7 is a diagram illustrating a 2D mask mesh that is generated by applying additional background points according to an exemplary embodiment.

According to the exemplary embodiment, three proximal vertices are grouped together to create a triangle based on position data (x, y) of a feature point, and by applying this process to each feature point, groups of triangles may be generated.

The group of triangles may be defined as a 2D mask mesh, and by using the 2D mask mesh, the 3D mask model may be generated.

At this time, if the 2D mask mesh is formed by only the feature points of the mask image, most of the resulting triangles are obtuse-angled triangles, and thus it is difficult to build a mesh structure optimized to create the 3D mask model.

According to the exemplary embodiment, at least one additional background point that is required for reducing the number of obtuse-angled triangles that correspond to at least one group of triangles may be set, and by using at least one group of triangles and at least one background point, the 2D mask mesh may be generated as shown in FIG. 7.

Figure 8:
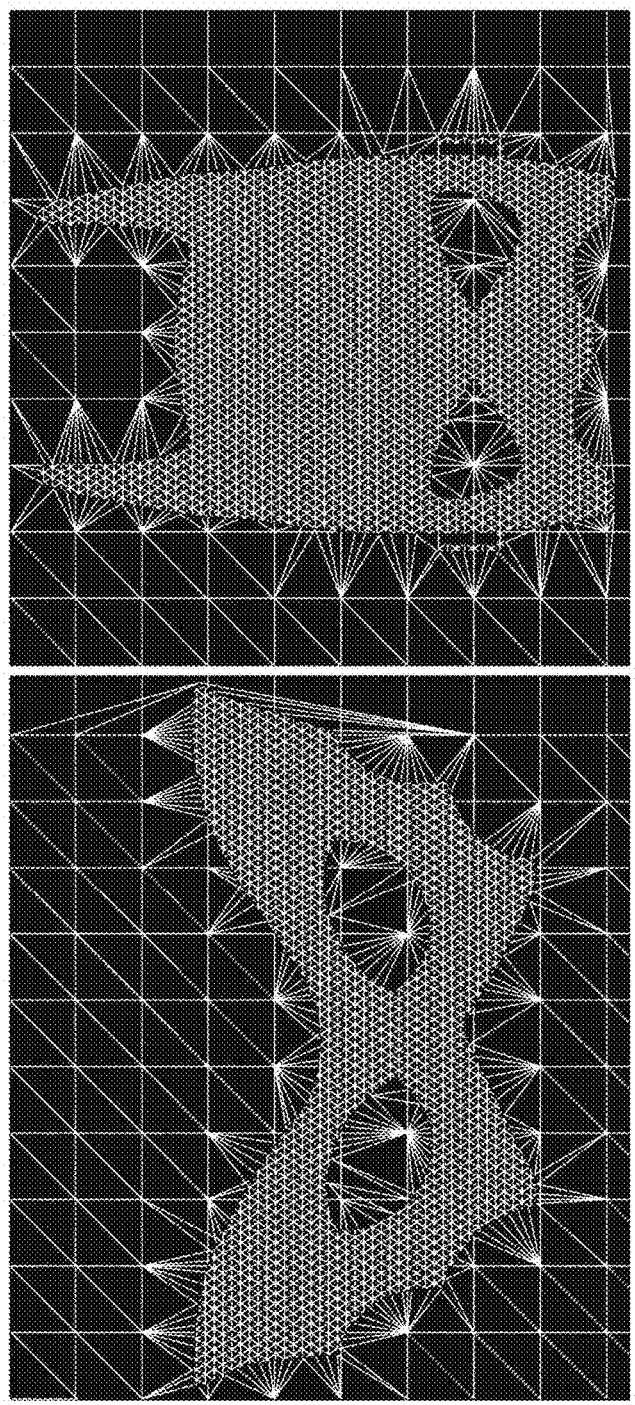
FIG. 8 is a diagram illustrating a 2D mask mesh generated according to an exemplary embodiment.

FIG. 8 is a diagram illustrating a 2D mask mesh generated according to an exemplary embodiment.

Referring to FIG. 8, a 2D mask mesh is illustrated in which inner triangles are represented by white color and external triangles are represented by black.

According to the exemplary embodiment, the addition of a certain number of additional background points causes an increase in the number of groups of triangles, and hence the internal mesh structure may be configured to be dense by applying more number of background points than those applied to the external area of the 2D mask, while the external mesh structure is configured to be less dense than the internal mesh structure, thereby reducing the load of triangle computation.

Figure 9:
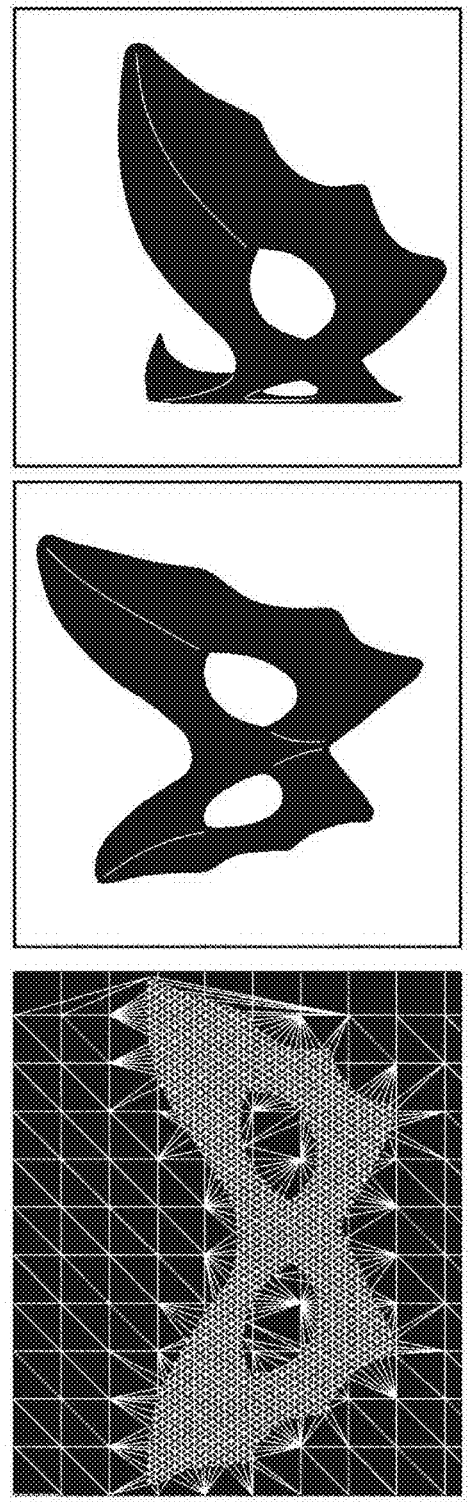
FIG. 9 is a diagram illustrating a 3D mask model modified to be a curved surface according to an exemplary embodiment.

FIG. 9 is a diagram illustrating a 3D mask model modified to be a curved surface according to an exemplary embodiment.

FIG. 9 illustrates a 3D mask model that is generated by the 3D mask model generator 200 according to the exemplary embodiment.

According to the exemplary embodiment, a vertex z-value in 3D space may be calculated using X-Y coordinate values of a vertex of the 2D mask in the image space that are contained in the 2D mask mesh.

At this time, by adding z-values to the 2D mask that is formed by vertices (x, y) in 2D space, the vertices of the 2D mask can be transformed into vertices (x, y, z) in 3D space, and by using the vertices, the 3D mask model may be created.

According to the exemplary embodiment, since the source mask in the 2D mask image is a plane mask, a predetermined curvature may be added to transform the planar mask into a curved 3D mask so as to fit on the facial shape.

Figure 10:
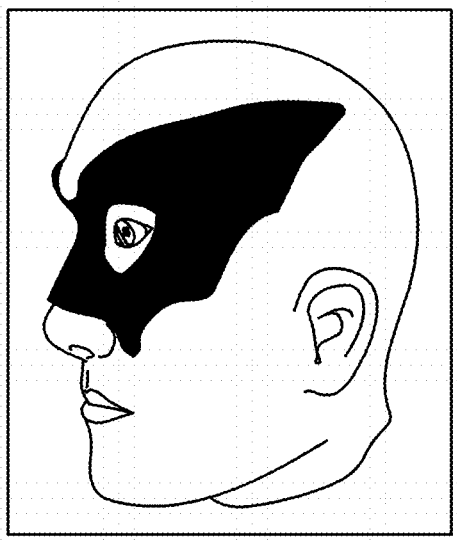
FIG. 10 is a diagram illustrating a 3D mask model that is modified to fit on the facial shape according to 3D face scanning data.

FIG. 10 is a diagram illustrating a 3D mask model that is modified to fit on the facial shape according to 3D face scanning data.

Referring back to FIG. 7, the 3D mask model may be transformed into a 3D planar mask in 3D space, and then modified to be located at an appropriate position in 3D space according to the 3D face scanning data.

According to the exemplary embodiment, the 3D mask model may be modified according to the facial shape specified by the 3D face scanning data, and thereby a final 3D mask model customized to the user's facial shape can be achieved.

Figure 11:
FIG. 11 is a diagram illustrating a 3D volume mask model according to an exemplary embodiment.

FIG. 11 is a diagram illustrating a 3D volume mask model according to an exemplary embodiment.

FIG. 11 illustrates a 3D volume mask model to be output by a 3D printer, for which volume is created for an original planar 3D mask model.

According to the exemplary embodiment, the modified planar 3D mask model is copied to create two 3D mask models.

Then, outer vertices of each of the two 3D mask models are extracted to generate outer vertex data of each 3D mask model, and outer vertices specified by the outer vertex data of one 3D mask model are connected to corresponding outer vertices of the other 3D mask model at a specific distance, thereby creating volume for a final 3D volume mask model.

Figure 12:
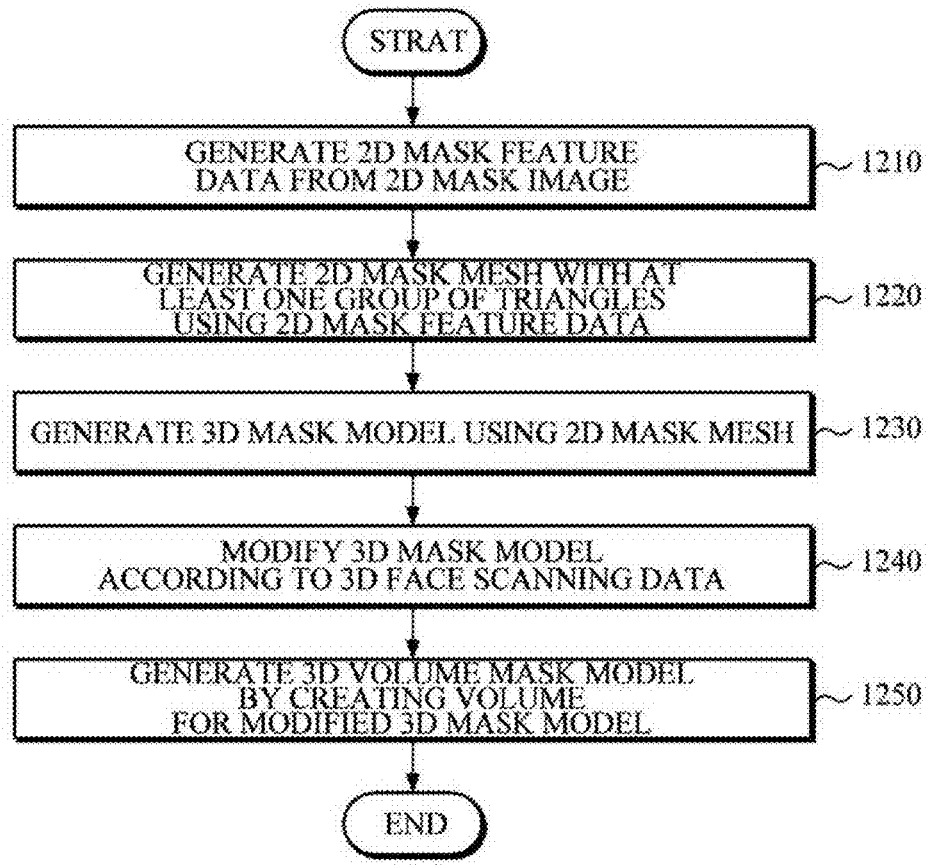
FIG. 12 is a flowchart illustrating a method of generating 3D volume mask model data according to an exemplary embodiment.

FIG. 12 is a flowchart illustrating a method of generating 3D volume mask model data according to an exemplary embodiment.

2D mask feature data is generated from a 2D mask image, as depicted in 1210.

According to the exemplary embodiment, contour data about the outer contour and holes inside the mask may be extracted from 2D mask image, feature points on the mask shape may be obtained using the extracted contour data, and the 2D mask feature data may be generated containing the feature points.

According to the exemplary embodiment, data required for 3D mask model creation may be extracted from the received 2D mask image.

At this time, the data about the 2D mask's contours may be extracted from the 2D mask image, for which data about not only the outer contour but also holes inside the mask is extracted and data about feature points of the contours is extracted, and the extracted data is stored as mask data.

Here, feature data of the 2D mask image may be generated by extracting only the contour feature points of the mask while removing the background.

According to the exemplary embodiment, in order to facilitate the extraction of contour feature points, the background may be set to be transparent or to be filled with a specific color during the mask design process.

According to the exemplary embodiment, the outer contour and the inner holes contained in the contour data may be set differently, thereby distinguishing between the external and internal areas of the mask.

2D mask mesh with at least one group of triangles is generated using the 2D mask feature data, as depicted in 1220.

According to the exemplary embodiment, every three proximal feature points may be grouped together to create at least one group of triangles by using the 2D mask feature data; at least one additional background point that is required for reducing the number of obtuse-angled triangles that correspond to at least one group of triangles may be designated; and 2D mask mesh may be generated using said at least one group of triangles and said background point.

Here, the 2D mask mesh refers to a net structure that consists of at least one group of triangles, each composed of three proximal feature points.

According to the exemplary embodiment, in the course of generating the 2D mask mesh, at least one additional background point may be used to reduce the number of the existing contour feature points and obtuse-angled triangles that correspond to at least one group of triangles, each composed of feature points.

3D mask model data is generated using the 2D mask mesh, as depicted in 1230.

According to the exemplary embodiment, a vertex z-value in 3D space may be calculated using X-Y coordinate values of a vertex of the 2D mask that are contained in the 2D mask mesh, and, in turn, the 3D mask model may be generated using the calculated vertex z-value.

According to the exemplary embodiment, a z-value may be added to each vertex (x, y) that forms the 2D mask model, thereby transforming the vertices in 2D space into the vertices in 3D space.

According to the exemplary embodiment, a planar mask may be transformed into a curved surface by applying a predetermined curvature to the generated 3D mask model.

The 3D mask according to the generated 3D mask model may be planar when it is transformed from the 2D mask image.

However, a mask is generally arched to fit the facial contour, and hence a curvature predetermined by a user may be used to transform the planar mask into a curved 3D mask.

The curved 3D mask model is modified according to 3D face scanning data, as depicted in 1240.

According to the exemplary embodiment, 3D face scanning data obtained by scanning the user's face may be matched with the 3D mask in 3D space and the 3D mask model may be modified to fit on the facial shape specified by the 3D face scanning data.

Here, the 3D face scanning data may refer to data about a facial shape acquired by scanning a person's face with a 3D scanner.

According to the exemplary embodiment, the acquired 3D face scanning data may be matched with the 3D mask model in 3D space, and then the 3D mask model may be modified to fit on the facial shape specified by the 3D face scanning data by adjusting the size, curves, and angles of the 3D mask model.

Volume is assigned to the modified 3D mask model to generate 3D volume mask model, as depicted in 1250.

According to the exemplary embodiment, the modified 3D mask model may be copied to create two 3D mask models, outer vertices of the two 3D mask models may be extracted to generate outer vertex data of each mask, and volume may be created by connecting vertices specified by the outer vertex data of one mask model to corresponding vertices of the other mask model at a specific distance, thereby generating the 3D volume mask model data.

According to the exemplary embodiment, by connecting outer vertices specified by the outer vertex data of one 3D mask model to corresponding outer vertices of the other mask model at a specific distance, a thickness can be created and thus the 3D mask model that originally does not have a thickness can have volume.

According to the exemplary embodiment, the generated 3D volume mask model data may be stored and provided upon request.

According to the above exemplary embodiment, it is possible to produce a 3D mask by immediately printing a 3D mask volume model with a 3D printer, for which 2D mask data is generated from a 2D mask image in which a part of a mask is located beyond the surface area of a face designed by a user, a 2D mask mesh is created based on feature points that form the 2D mask data, the 2D mask mesh is transformed into a 3D mask model according to user's settings, a created 3D mask model is modified according to the facial shape of a person who will wear the mask, and then the 3D mask volume model is generated.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating 3-dimensional (3D) volume mask data, comprising:
   a 2-dimensional (2D) mask data collector configured to generate 2D mask feature data, which contains feature points, the 2D mask feature data being generated by using contour data extracted from a 2D mask image,
   generate at least one group of triangles by grouping every three proximal feature points of the 2D mask feature data, and
   generate a 2D mask mesh using the at least one group of triangles;
   a 3D mask model generator configured to calculate a vertex z-value in 3D space using X-Y coordinate values of a vertex of a 2D mask which are contained in the 2D mask mesh, and generate 3D mask model using the calculated vertex z-value; and
   a 3D mask model adjuster configured to modify the 3D mask model to be located in 3D space based on acquired 3D face scanning data, extract outer vertices data of the modified 3D mask model, and generate 3D volume mask model by connecting each vertex of the extracted outer vertices corresponding to the 3D mask model to create volume of the 3D mask model,
   wherein the 3D mask model generator is configured to transform a planar mask model into a curved 3D mask by applying a predetermined curvature to the generated 3D mask model data, and
   wherein the 3D mask model adjuster is configured to comprise:
   a 3D mask model modifier configured to match the 3D face scanning data acquired by scanning a user's face with the 3D mask model in 3D space, and modify the 3D mask model to fit on a facial shape specified by the 3D face scanning data; and
   a 3D mask model volume adder configured to copy the modified 3D mask model to create two 3D mask models, extract outer vertices of the two 3D mask models to generate outer vertex data of each mask model, and create volume by connecting vertices of one 3D mask model to corresponding vertices of the other 3D mask model at a specific distance, thereby generating the 3D volume mask model.

2. The apparatus of claim 1, further comprising:
   a 3D volume mask model database configured to store the generated 3D volume mask model and provide the 3D volume mask model on request.

3. The apparatus of claim 1, wherein the 2D mask data collector is configured to comprise:
   a 2D mask feature data generator configured to extract the contour data about an outer contour and holes inside a mask from 2D mask image data, generate the feature points about a mask shape using the extracted contour data, and generate the 2D mask feature data that contains the feature points; and
   a 2D mask mesh generator configured to generate the at least one group of triangles by grouping every three proximal feature points of the 2D mask feature data, designate at least one additional background point that is required for reducing a number of obtuse-angled triangles that correspond to the at least one group of triangles, and generate the 2D mask mesh using the at least one group of triangles and the at least one background point.

4. The apparatus of claim 3, wherein the 2D mask feature data generator is configured to set a background of the received 2D mask image to be transparent or fill the background with a specific color.

5. The apparatus of claim 3, wherein the 2D mask feature data generator is configured to represent the outer contour and the holes differently in the contour data, thereby distinguishing between external and interior areas of the mask.

6. A computer-implemented method for generating 3-dimensional (3D) volume mask model, the method including at least one collector, generator, and adjuster being configured and executed by a processor using algorithm associated with a non-transitory device the method comprising steps;
   generating 2D mask feature data which contains feature points, the 2D mask feature data being generated by using contour data extracted from a 2D mask image,
   generating at least one group of triangles by grouping three proximal feature points of the 2D mask feature data, and
   generating a 2D mask mesh using the at least one group of triangles;
   calculating a vertex z-value in 3D space using X-Y coordinate values of a vertex of 2D mask which are contained in the 2D mask mesh, and generating 3D mask model using the calculated vertex z-value; and
   modifying a 3D mask model to be located in 3D space based on acquired 3D face scanning data, extracting outer vertices data of the modified 3D mask model, and generating 3D volume mask model data by connecting each vertex of the extracted outer vertices corresponding to the 3D mask model to create volume of the 3D mask model,
   wherein the generation of the 3D volume mask model data comprises:
   matching the 3D face scanning data acquired by scanning a user's face with the 3D mask model in 3D space, and modifying the 3D mask model to fit on a facial shape specified by the 3D face scanning data; and
   copying the modified 3D mask model to create two 3D mask models, extracting outer vertices of the two 3D mask models to generate outer vertices of each mask model, and creating volume by connecting vertices of one 3D mask model to corresponding vertices of the other 3D mask model at a specific distance, thereby generating the 3D volume mask model.

7. The method of claim 6, further comprising: storing the generated 3D volume mask model and providing the 3D volume mask model data on request.

8. The method of claim 6, wherein the generation of the 2D mask mesh comprises: extracting the contour data about an outer contour and holes inside a mask from 2D mask image, generating the feature points on a mask shape using the extracted contour data and generating the 2D mask feature data that contains the feature points; and generating the at least one group of triangles by grouping every three proximal feature points of the 2D mask feature data, designating at least one additional background point that is required for reducing a number of obtuse-angled triangles that correspond to the at least one group of triangles, and generating the 2D mask mesh using the at least one group of triangles and the at least one background point.

9. The method of claim 8, wherein the generation of the 2D mask feature data comprises setting a background of the received 2D mask image to be transparent or filling the background with a specific color.

10. The method of claim 8, wherein the generation of the 2D mask feature data comprises representing the outer contour and the holes differently in the contour data, thereby distinguishing between external and interior areas of the mask.

* * * * *